(12) United States Patent
Liu et al.

(10) Patent No.: US 7,292,572 B2
(45) Date of Patent: Nov. 6, 2007

(54) MULTI-LEVEL REGISTER BANK BASED CONFIGURABLE ETHERNET FRAME PARSER

(75) Inventors: Hongping Liu, Milpitas, CA (US); Zhiqiang J. Su, San Jose, CA (US)

(73) Assignee: LSI Corporation, Milpitas, CA (US)

( * ) Notice: Subject to any disclaimer, the term of this patent is extended or adjusted under 35 U.S.C. 154(b) by 1032 days.

(21) Appl. No.: 10/316,344

(22) Filed: Dec. 11, 2002

(65) Prior Publication Data

US 2004/0125807 A1    Jul. 1, 2004

(51) Int. Cl.
*H04L 12/28*    (2006.01)
*H04J 3/04*    (2006.01)
*H04J 3/16*    (2006.01)

(52) U.S. Cl. .................. 370/389; 370/412; 370/465

(58) Field of Classification Search ................ 370/392, 370/390, 410, 465, 466, 467, 473, 476, 477, 370/389, 535, 412; 709/230, 236; 726/25, 726/22, 23

See application file for complete search history.

(56) References Cited

U.S. PATENT DOCUMENTS

| | | | | |
|---|---|---|---|---|
| 5,805,808 A | * | 9/1998 | Hasani et al. | 709/243 |
| 5,916,305 A | * | 6/1999 | Sikdar et al. | 709/236 |
| 6,804,236 B1 | * | 10/2004 | Mahajan et al. | 370/390 |
| 7,149,211 B2 | * | 12/2006 | Bennett et al. | 370/357 |
| 7,191,259 B2 | * | 3/2007 | Gil | 710/33 |

* cited by examiner

*Primary Examiner*—Hanh Nguyen
(74) *Attorney, Agent, or Firm*—Christopher P. Maiofana PC

(57) ABSTRACT

An apparatus comprising a first circuit and a second circuit. The first circuit may be configured to generate a plurality of match signals in response to an incoming data signal. Each match signal is generated in response to different search criteria. The second circuit may be configured to present a protocol indication signal in response to the plurality of match signals.

20 Claims, 9 Drawing Sheets

MULTI-LEVEL REGISTER BANK BASED CONFIGURABLE ETHERNET FRAME PARSER

FIELD OF THE INVENTION

The present invention relates to digital network communications generally and, more particularly, to a method and/or architecture for implementing a multi-level register bank based configurable Ethernet frame parser.

BACKGROUND OF THE INVENTION

Important functions in an Ethernet switch (such as a layer 2 or 3 switch) include parsing the incoming Ethernet frame, extracting multiple fields from the frame, and analyzing the Ethernet header and the higher level protocol header to decode the protocol type. This function is typically carried out in the Ethernet port control logic module. The extracted and derived information is then provided to the Ethernet switch engine to determine how to process the incoming frame from one of the ports of the switch.

Several conventional approaches have been used for implementing frame parsers. A first conventional approach is a hardcoded logic hardware implementation. Such an implementation is protocol specific, based on the assumption that the protocols supported are fixed and predefined. The key patterns are hardcoded or hardwired in the fixed logic circuitry. Each key pattern corresponds to a protocol supported by the switch. This frame parser approach parses through the incoming data stream from the MAC engine, one byte at a time for every clock cycle, and checks if the data bytes at predefined positions match the values defined in the supported protocols.

The first conventional approach can be optimized from a hardware implementation point of view. In particular, such an approach can perform frame parsing without any extra latency. Therefore, no extra buffer is needed, since the byte parsing and comparison can be completed within 1 clock cycle period in which a byte of a packet is received. However, this approach lacks flexibility and in-field upgradability after fabrication.

A second conventional approach is a microprocessor based firmware implementation. Each switch port has a designated microprocessor which is used to execute a frame parsing microcode. The microcode is used to define the key patterns the microprocessor should be looking for when parsing through the receiving byte stream. At the initialization stage, host CPU software is responsible for placing the microcode into a SRAM from which the microprocessor fetches the instructions.

The second conventional approach overcomes the problem of the first conventional approach (i.e., providing flexibility in the type of protocol supported and providing full programmability). However, the second conventional approach needs a dedicated microprocessor/micro-controller for executing the frame parsing microcode for each port. Implementing a dedicated microprocessor incurs a high silicon area penalty. In addition, the microprocessor runs at a much higher frequency than the system clock (to keep up with the network wire-speed) which increases power consumption.

A third conventional approach is a pure software implementation. After a packet is received and placed into memory buffers, the host CPU reads the data from the memory buffers, executes the software to extract multiple fields from the packet, and compares the fields with the defined values in the protocols the switch supports, therefore decoding the protocol types.

The third conventional approach is not practical for a layer 2 switch because of the intervention of host CPU software. The host CPU cannot start to parse the packet until the packet is received and placed in the memory buffer. As a result, the corresponding latency is not acceptable for high speed network applications.

It would be desirable to implement an efficient frame parser (i) with flexibility and low latency, (ii) without adding extra latency to the switch, and/or (iii) that may be suitable for high-speed networks in order to support wire-speed throughput.

It would also be desirable to implement an Ethernet frame parser that (i) is flexible and field ungradable, (ii) may be implemented without microprocessor or micro-controller to execute frame parsing microcode, (iii) does not need to run at a higher frequency than the system clock, (iv) may be implemented without the intervention of host CPU software, and (v) is capable of supporting existing and new protocols without hardware changes.

SUMMARY OF THE INVENTION

The present invention concerns an apparatus comprising a first circuit and a second circuit. The first circuit may be configured to generate a plurality of match signals in response to an incoming data signal. Each match signal is generated in response to different search criteria. The second circuit may be configured to present a protocol indication signal in response to the plurality of match signals.

The objects, features and advantages of the present invention include providing a multi-level register bank based configurable Ethernet frame parser that may (i) provide a frame parser that is configurable through 2 or more register banks, (ii) be flexible compared to a hardcoded logic implementation, (iii) be able to parse receiving packets in real-time, (iv) be suitable for implementation in a high speed network, (v) provide a low cost implementation in terms of silicon die size, (vi) be implemented without a dedicated microprocessor or micro-controller for executing the frame parsing microcode for each port, (vii) run at frequency equal to or less than the system clock, and/or (viii) operate without the intervention of host CPU software.

BRIEF DESCRIPTION OF THE DRAWINGS

These and other objects, features and advantages of the present invention will be apparent from the following detailed description and the appended claims and drawings in which:

DETAILED DESCRIPTION OF THE PREFERRED EMBODIMENTS

The present invention generally comprises a configurable or programmable Ethernet frame parser. The present invention may be flexible (when compared with a hard coded logic implementation) with respect to the Ethernet protocols that are supported.

The present invention may implement a frame parser may be used to parse through a receiving data stream to extract multiple fields such as (i) destination address (DA), (ii) source address (SA), and/or (iii) Virtual Local Area Network (VLAN) ID, etc. from the Ethernet protocol header and/or payload. Based on the multiple extracted fields, the frame parser may derive information such as multicast protocol type and priority of the receiving packet if the packet is VLAN tagged. In the following context, multicast type decoding may be used as an example to show the operation mechanism of the configurable frame parser.

Figure 1:
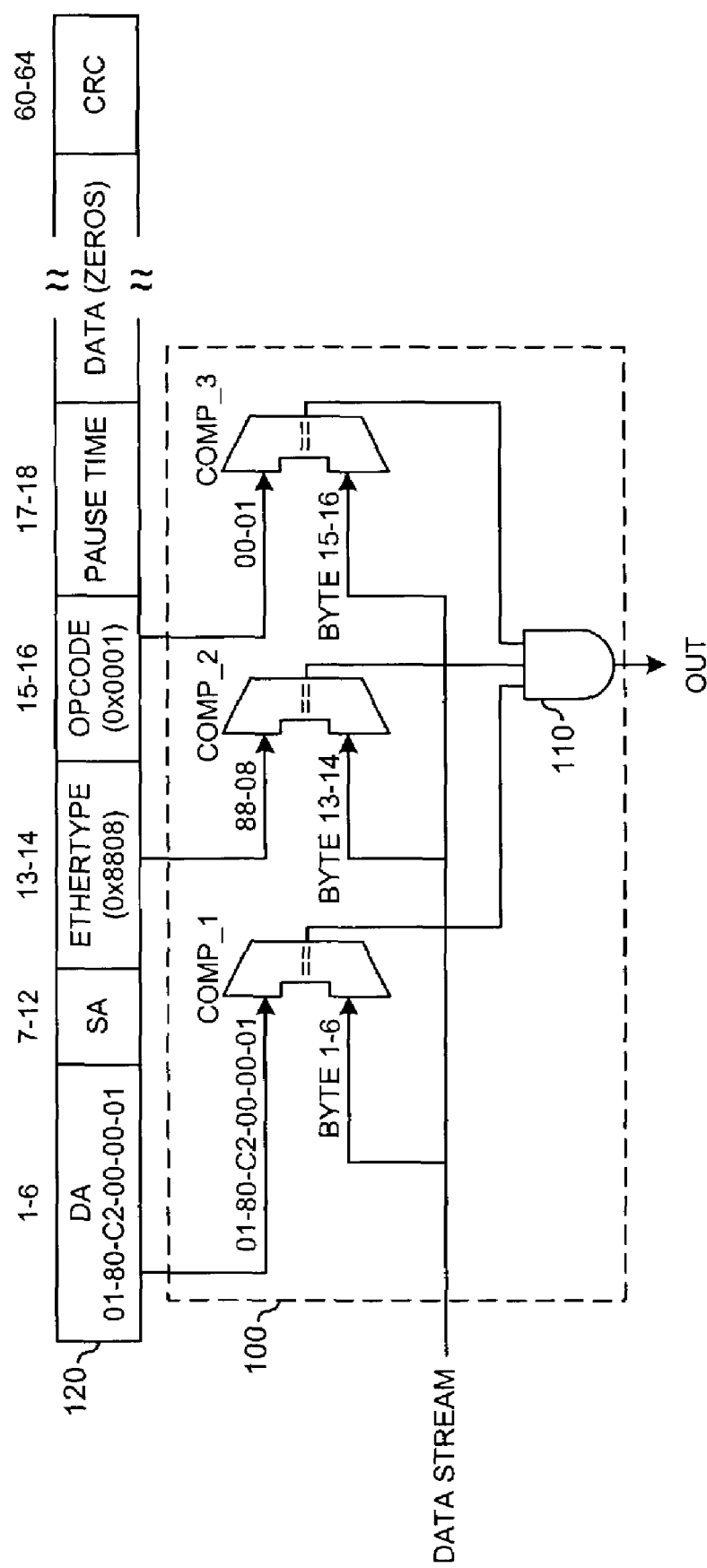
FIG. 1 is a diagram illustrating the decoding of a multicast pause packet.

Referring to FIG. 1, a diagram is shown illustrating a circuit 100 for decoding a multicast pause packet. The circuit 100 generally comprises a comparator (e.g., COMP_1), a comparator (e.g., COMP_2), a comparator (e.g., COMP_3) and a gate 110. A default pause frame 120 provides protocol fields for the circuit 100 to check (or compare) against an incoming signal (e.g., DATA_STREAM). The signal DATA_STREAM generally comprises a series of packets sequentially transmitted. The circuit 100 checks for several key fields in the signal DATA_STREAM. The complexity of the parsing may vary from protocol to protocol. For example, identification of a pause packet may include checking the following key fields in the protocol (i) DA (e.g., located at byte 1~6 with a value of 01-80-c2-00-00-01), (ii) Ethernet type field (e.g., located at byte 13~14 with a value of 0x8808), and (iii) Opcode (e.g., located at byte 15~16 with value of 0x0001).

The comparator COMP_1 may be used to compare the first six bytes of data from the signal DATA_STREAM with a default DA field (e.g., 01-80-C2-00-00-01). The comparator COMP_2 may be used to compare byte 13 and 14 from the signal DATA_STREAM to the Ethernet type field of 88-08. The comparator COMP_3 may be used to compare byte 15 and 16 of the signal DATA_STREAM with the opcode field of 00-01. An output of each of the comparators COMP_1-COMP_3 is generally presented to the gate 110. If the three fields all match the specified value, a pause packet may be identified by triggering an output flag (e.g., OUT).

Figure 2:
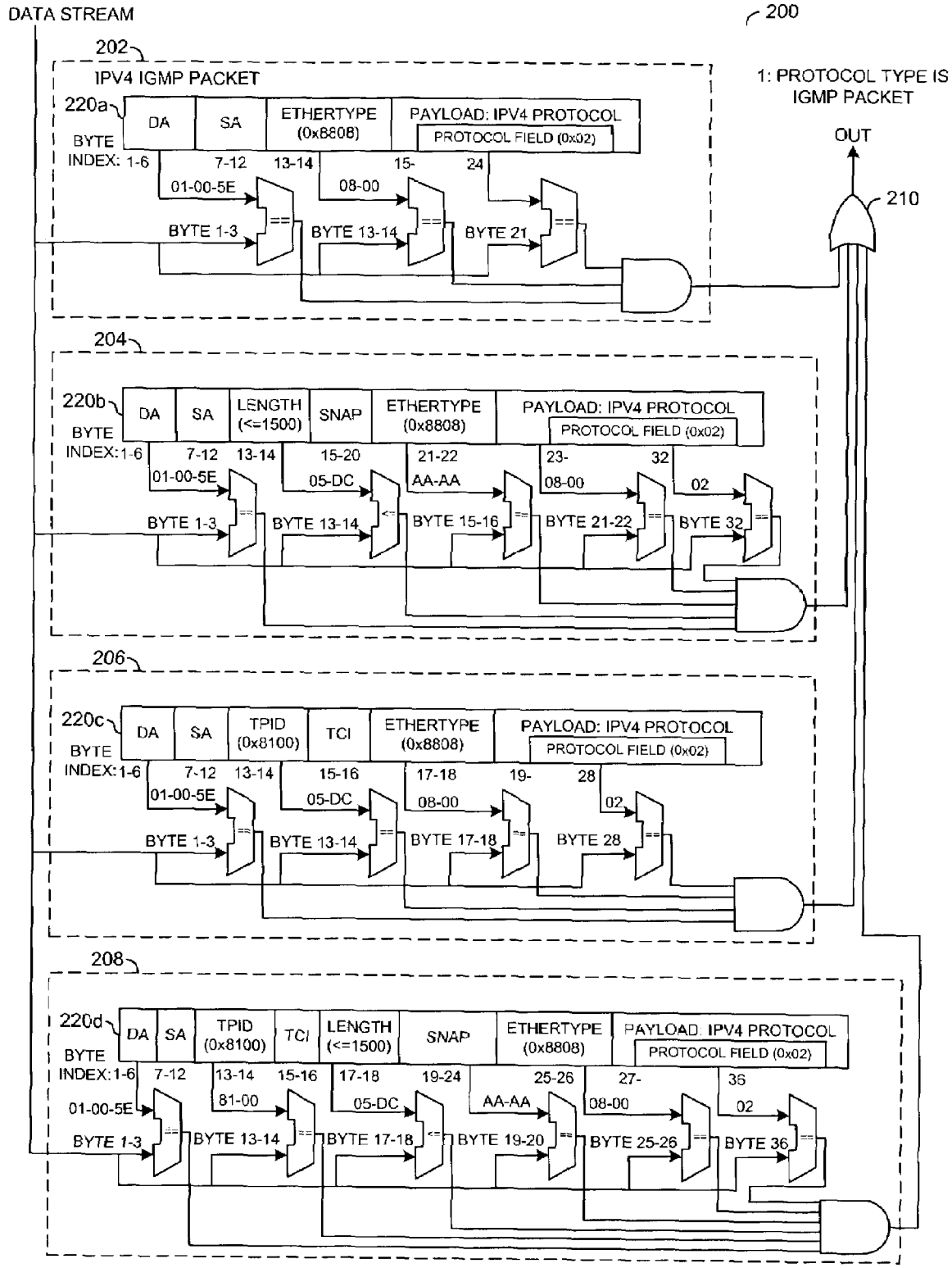
FIG. 2 is a diagram illustrating the decoding of an Internet Group Management Protocol (IGMP) packet from an Internet Protocol Version 4 (IPv4) packet.

Referring to FIG. 2, a diagram of a circuit 200 illustrating decoding of Internet Group Management Protocol (IGMP) from an Internet Protocol Version 4 (IPv4) packet is shown. The circuit 200 generally comprises a block (or circuit) 202, a block (or circuit) 204, a block (or circuit) 206, a block (or circuit) 208 and a gate 210. The gate 210 may be implemented as an OR gate. However, other logic may be implemented to meet the design criteria of a particular implementation. Each of the circuits 202, 204, 206 and 208 are generally implemented as compare circuits, similar to the circuit 100 of FIG. 1. The circuit 202 generally compares the signal DATA_STREAM to a default frame 220a. The circuit 204 generally compares the signal DATA_STREAM to a default frame 220b. Similarly, the circuit 206 compares the signal DATA_STREAM to a default frame 220c. The circuit 208 compares the signal DATA_STREAM to a default frame 220d. The circuit 200 determines if the signal DATA_STREAM matches any of the default frames 220a-220d. If a match occurs, the gate 210 presents a signal (e.g., OUT) indicating that a IGMP packet has been detected.

Decoding of IGMP, Open Shortest Path First (OSPF) and Protocol Independent Multicast (PIM) multicast packets may be more complicated since such packets cannot generally be uniquely identified by only the DA field and the Ethernet type field. In particular, the Protocol Data Unit (PDU) may need to be further parsed. The PDU may be encapsulated in the packets of signal DATA_STREAM as either IPv4 or IPv6 PDUs. If a packet is identified with a IPv4 PDU, then the protocol field, positioned at byte 10 in a IPv4 header, may be used to determine whether the packet is IGMP, OSPF or PIM. If the protocol field is 0x02, 0x59 or 0x67, the multicast type may be IGMP, OSPF or PIM, respectively. If a packet is identified with a IPv6 PDU, byte 7 in a IPv6 header may be used as an identifier. Decoding of IGMP from IPv6 may be similar.

Figure 3:
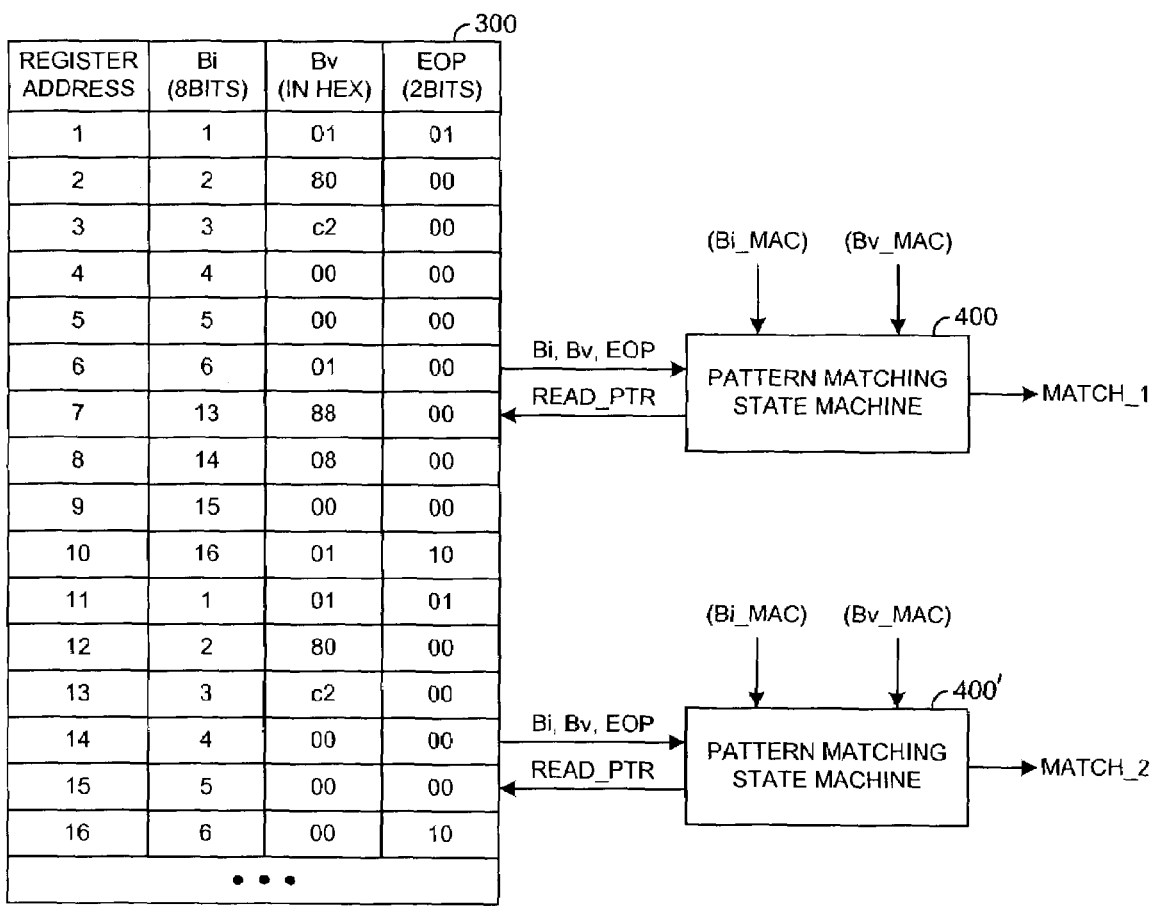
FIG. 3 is a diagram illustrating the format of a register bank.

Referring to FIG. 3, a diagram is shown illustrating the format of a bank register 300. The decoding of a multicast pause packet shown in FIG. 1 and a IGMP IP packet shown in FIG. 2 may be a typical way of implementing hardcoded logic for a frame parser. A frame parser may need to know the patterns to look for in a receiving frame. Each pattern may be associated with a specific protocol type. In one example, the pattern associated with a pause packet may be defined by a set of tuples (e.g., (Bi, Bv)), where Bi may represent the byte index and Bv may stand for the byte value. In the hardcoded logic method described in the background section, these patterns may be hardcoded in a state machine which cannot normally be changed or modified after fabrication. Therefore, with approaches described in the background section, any new protocol that is not considered or hardcoded in the circuitry may not be supported by this type of frame parser. To overcome the limitation of the hardcoded logic implementation of the background section the configurable Ethernet frame parser of the present invention may be implemented.

Instead of hardcoding search patterns, the register bank 300 may be programmed with the key patterns during initialization by the host CPU. The pattern length is generally fixed. A 2-bit flag (e.g., End of Pattern (EOP)) may be used to flag start-of-pattern (e.g., 01), continuation-of-pattern (e.g., 00), end-of-pattern (e.g., 10), and start-and-end-of-pattern (e.g., 11). A value of 11 may indicate that the length of the pattern is 1. The register bank 300 illustrates the format that a host CPU may use to program the search patterns. For example, two patterns may be programmed in the register bank 300. The first pattern may be for a pause packet and the second pattern may be for a spanning tree protocol. A read pointer signal (e.g., READ_PTR) is generally presented to the register bank 300 from a state machine 400 and a state machine 400'. The register bank 300 generally presents the signals Bi, Bv and EOP to the state machine 400 (or 400'). The state machine 400 generally presents (or generates) a match signal (e.g., MATCH_1) in response to the signal Bi, the signal Bv, the signal EOP, the signal Bi_MAC and the signal Bv-MAC. The signal Bv_MAC may be a data byte from the MAC core. The signal Bi_MAC may be a byte index of the input data. Similarly, the state machine 400' may generate a match signal (e.g., MATCH_2) in response to the signal Bi, the signal Bv, the signal EOP, the signal Bi_MAC and/or the signal Bv_MAC.

In general, each of the state machines 400 and 400' maintains a separate read pointer. The inputs shown in the figure correspond to the contents of the register bank 300. However, the inputs to the state machine 400 and 400' receive different values.

Figure 4:
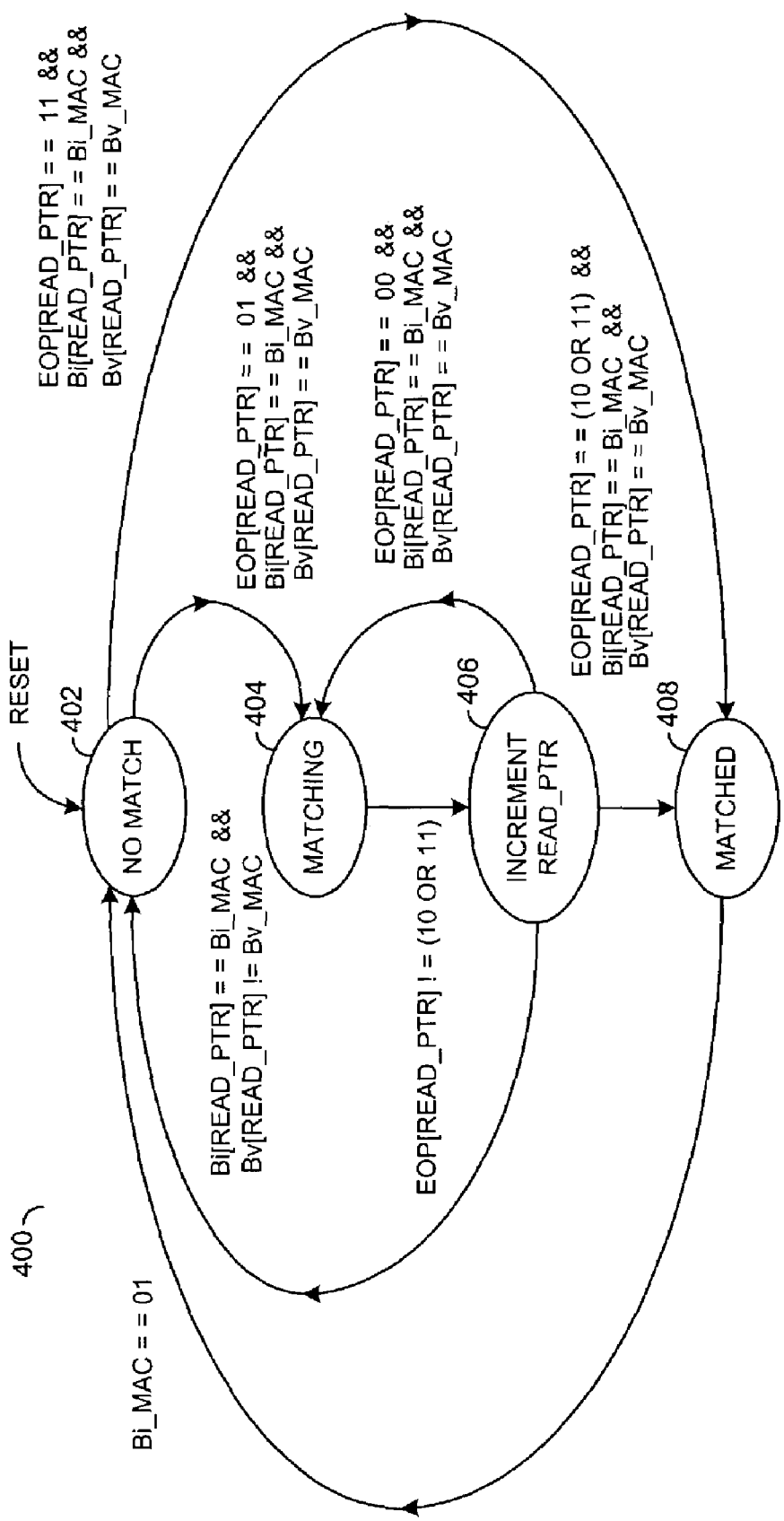
FIG. 4 is a diagram illustrating a process of a state machine performing pattern matching.

Referring to FIG. 4, a more detailed diagram of the state diagram 400 is shown illustrating a process (or method) of the present invention. The state diagram 400 (or state machine) may implement the pattern matching functions described. The state diagram 400 details various transitions. At start up, a host CPU may program the register bank 300 with the key patterns related to all the protocols to be supported during operation. The state machine 400 may be implemented as a designated pattern matching state machine that may be used for each pattern defined in the register bank 300. The state machine 400 may be responsible for performing pattern extraction and comparison against the one defined in the register bank 300.

The state machine 400 generally comprises a state 402, a state 404, a state 406, and a state 408. The state 402 generally indicates that no match has occurred. The state 404 indicates that matching is in progress. The state 406 increments the signal READ_PTR. The state 408 indicates a match has been detected. The state machine 400 may have an input Bv_MAC, an input Bi_MAC, and an input READ_PTR. The input READ_PTR may be a read pointer to the register bank 300 that may be initialized to the start of pattern. The input READ_PTR may be incremented whenever a byte of the pattern match is found. Also, the input READ_PTR may be returned back to the start of the pattern when the start of a new frame is received. A match may be found only if all of the byte values defined in the pattern match those from the signal DATA_STREAM at the specified byte positions. A separate pattern matching state machine 400 may be associated with each pattern programmed into the register bank 300. A plurality of state machines may operate in parallel and/or simultaneously.

The frame parser described above may be configurable and easy to implement. The frame parser may parse receiving packets as fast as they arrive with no extra latency added to the system. However, the area used for storage of the patterns may be optimized further since many of sub-patterns may be common for different protocols. To reduce the redundant storage for the common part of the patterns, a hierarchical multi-level scheme may be implemented.

Figure 5:
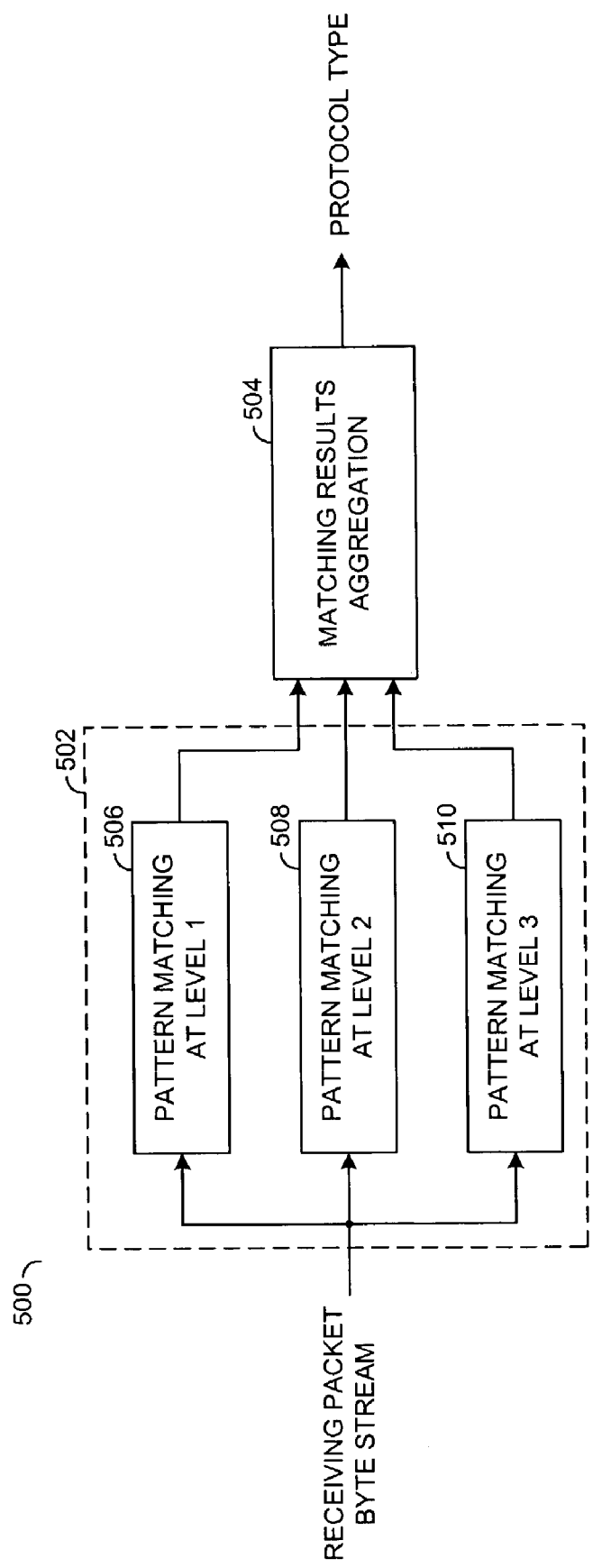
FIG. 5 is a block diagram illustrating a 3-level pattern matching based frame parser.

Referring to FIG. 5, a system 500 is shown illustrating a 3-level pattern matching based frame parser. However, other multi-level pattern matching schemes may be implemented to meet the design criteria of a particular implementation. The system 500 illustrates hierarchy configured to handle a particular decision. The hierarchy may be applied to other packet processing applications. The present architecture may be targeted to Ethernet switching, where 3-level pattern matching may provide an optimal solution. However, other protocols may be supported. The system 500 generally comprises a pattern matching block (or circuit) 502 and an aggregation block (or circuit) 504. The pattern match block 502 generally comprises a pattern matching block (or circuit) 506, a pattern matching block (or circuit) 508, and a pattern matching block (or circuit) 510.

As illustrated, key patterns may be divided into three sub-patterns. For example, a first sub-pattern may be the first 6 bytes of the DA pattern. A second sub-pattern may be the bytes located after the DA and before the payloads (e.g., the key field in this sub-pattern may be the Ethernet type, so it may be called Ethernet type pattern). A third sub-pattern may be the pattern bytes located within the payload (e.g., called the payload pattern). Correspondingly, the level register banks in the blocks 506, 508 and 510 may be used to program the 3 sub-patterns. The common sub-patterns may be put together at a DA pattern level (or Ethernet type pattern level). The common part of the patterns do not need to be repeated for the different sub-patterns. For example, when a packet is being received, the byte stream may undergo pattern matching at the three levels. The matching results may be aggregated to a single result of protocol type.

Figure 6:
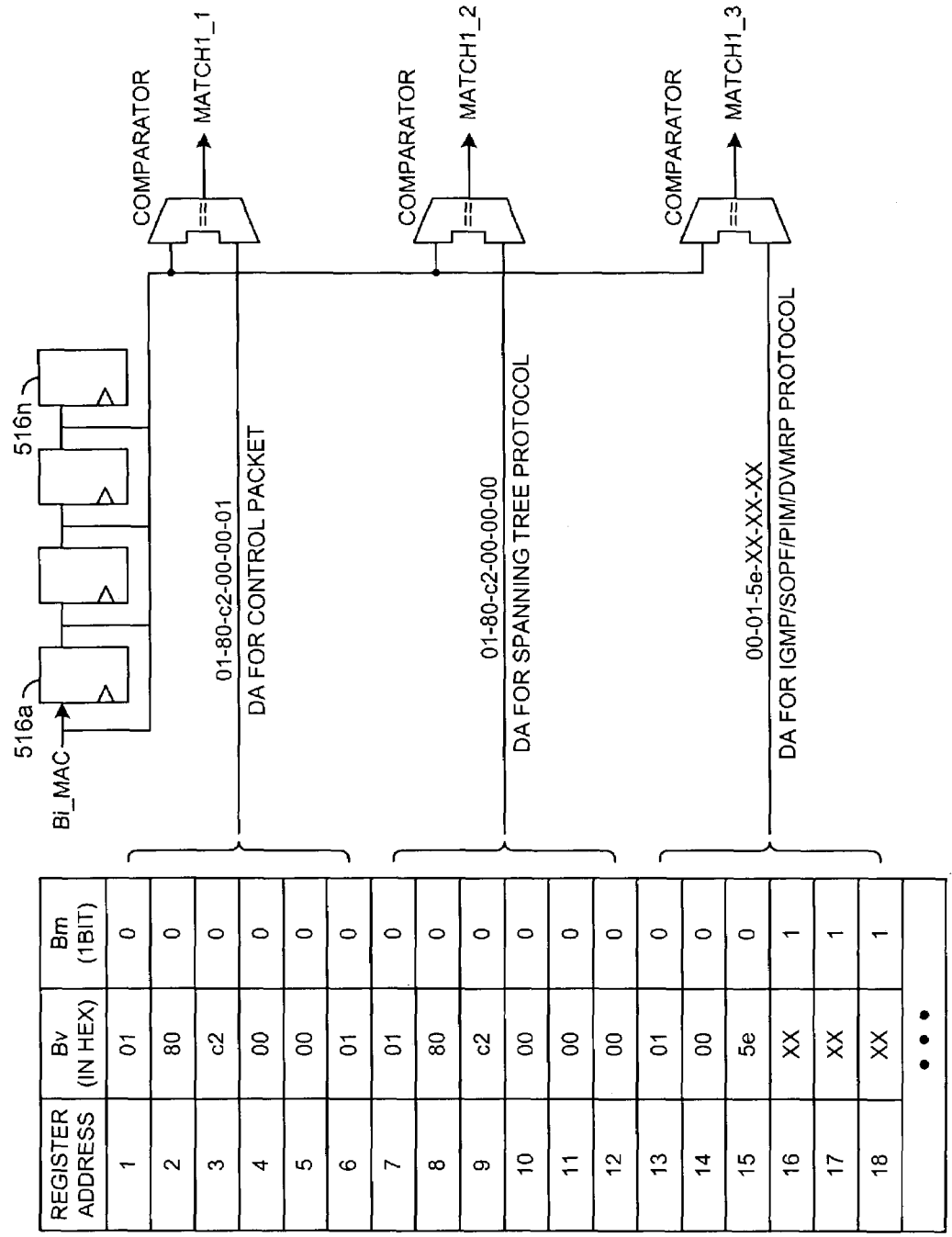
FIG. 6 is a diagram illustrating an example of pattern matching based on a level 1 register bank.

Referring to FIG. 6, a more detailed diagram of the level 1 register bank 506 is shown. The pattern stored in the register bank 506 may be the DA field. The length of the pattern may be fixed at 6 bytes. In this case, byte index field may not be necessary. There may be two fields stored in each register (e.g., Bv and Bm). The field Bv may represent the byte value and the field Bm may be a byte mask. When the field Bm is set to a value of one, the corresponding byte may not contribute in the pattern matching result. Some protocols may be decoded based only on the DA. In this case, only pattern matching results at level 1 may matter. This may be taken into account in the results of the aggregation stage 504. The implementation of DA field pattern matching may be straightforward. Five 8-bit registers 516a-516n may be used to capture the first 6 bytes of a received packet. Comparison may be initiated once the 6th byte is received. The matched pattern index at this level may be passed to the aggregation stage 504 for pattern matching aggregation in conjunction with the pattern matching result from the next two levels.

Figure 7:
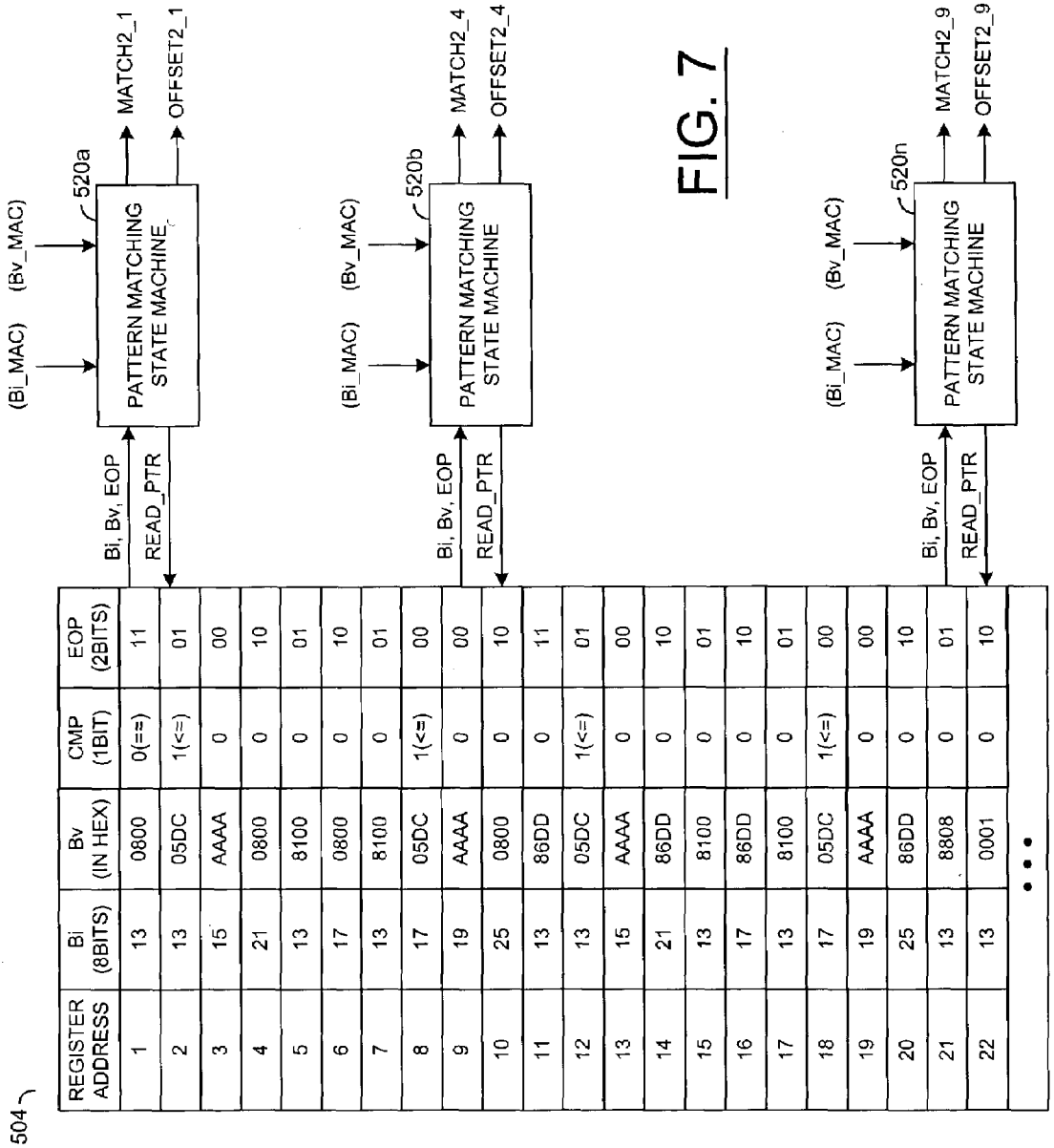
FIG. 7 is a diagram illustrating an example of pattern matching based on a level 2 register bank.

Referring to FIG. 7, a diagram illustrating the format of a level 2 register bank 508 for an Ethernet type pattern is shown. The pattern stored in the register bank 508 may not necessarily be restricted only to the Ethernet type field. For example, any field positioned after the DA field and before the payload field. The patterns stored at level 2 may be diversified and the length of the pattern may not necessarily be fixed. Since the length of the pattern is variable, a 2-bit EOP may be used to indicate start-of-pattern (e.g., 01), end-of-pattern (e.g., 10), and start-and-end-of-pattern (e.g., 11). A 1-bit CMP field may be used to define the comparison operator. If the CMP field value is 0, the 2-byte value specified at the Bi position should be equal to the Bv value programmed in the register bank 508. If the CMP value is 1, a less than or equal to function may be used to compare against the field Bv. A plurality of pattern matching state machines 520a-520n may be implemented. One of the may state machines 520a-520n may be used for each pattern configured in a register bank (similar to the register bank 300). The state machines 520a-520n may be similar to the state machine 400 illustrated in FIG. 4. However, an additional byte offset for calculating the absolute byte index of the pattern byte defined at the level 3 register bank 510 may be added.

Figure 8:
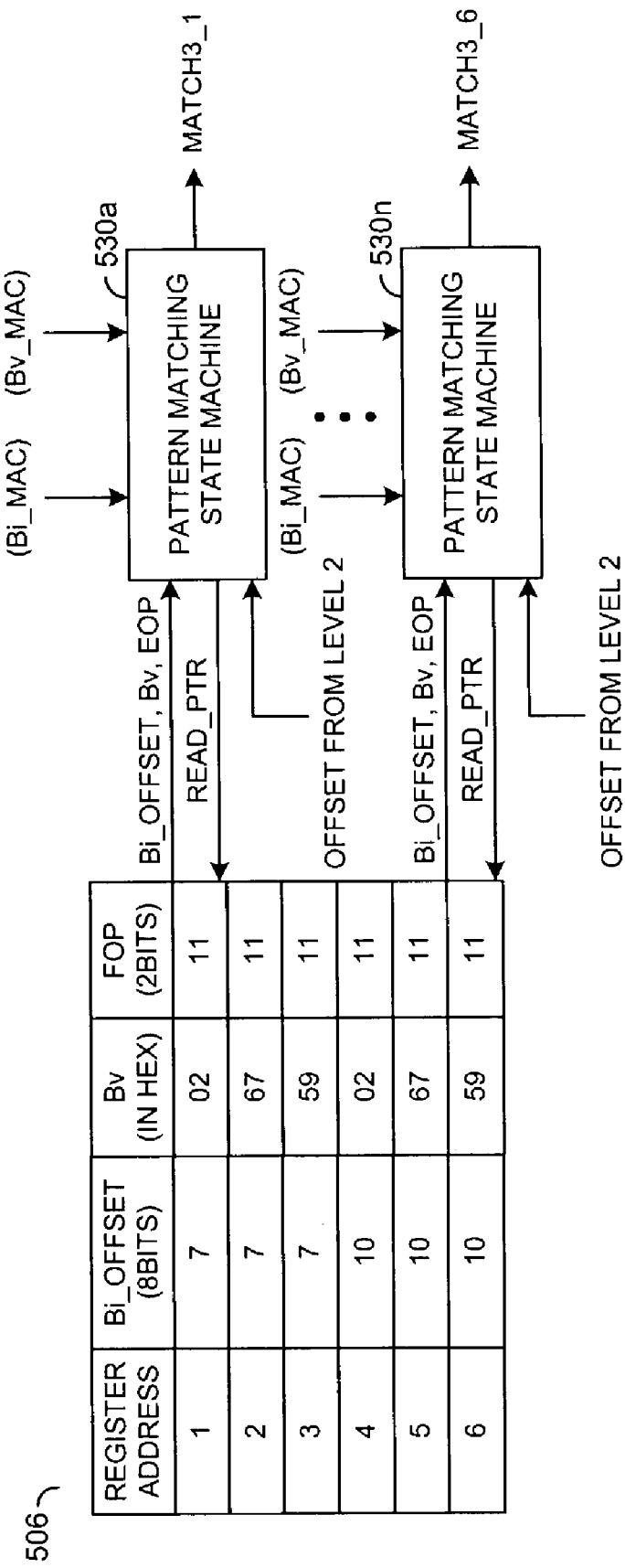
FIG. 8 is a diagram illustrating an example of pattern matching based on a level 3 register bank.

Referring to FIG. 8, a diagram illustrating the format of a level 3 register bank 510 for an Ethernet type pattern is shown. The field Bi_OFFSET of FIG. 8 may indicate the offset of byte position in the payload. The absolute byte index in the receiving packet may be obtained by adding the field Bi_OFFSET to the offset result generated at the level 2 pattern matching. The pattern matching state machines 530a-530n may be implemented as shown in FIG. 4.

Figure 9:
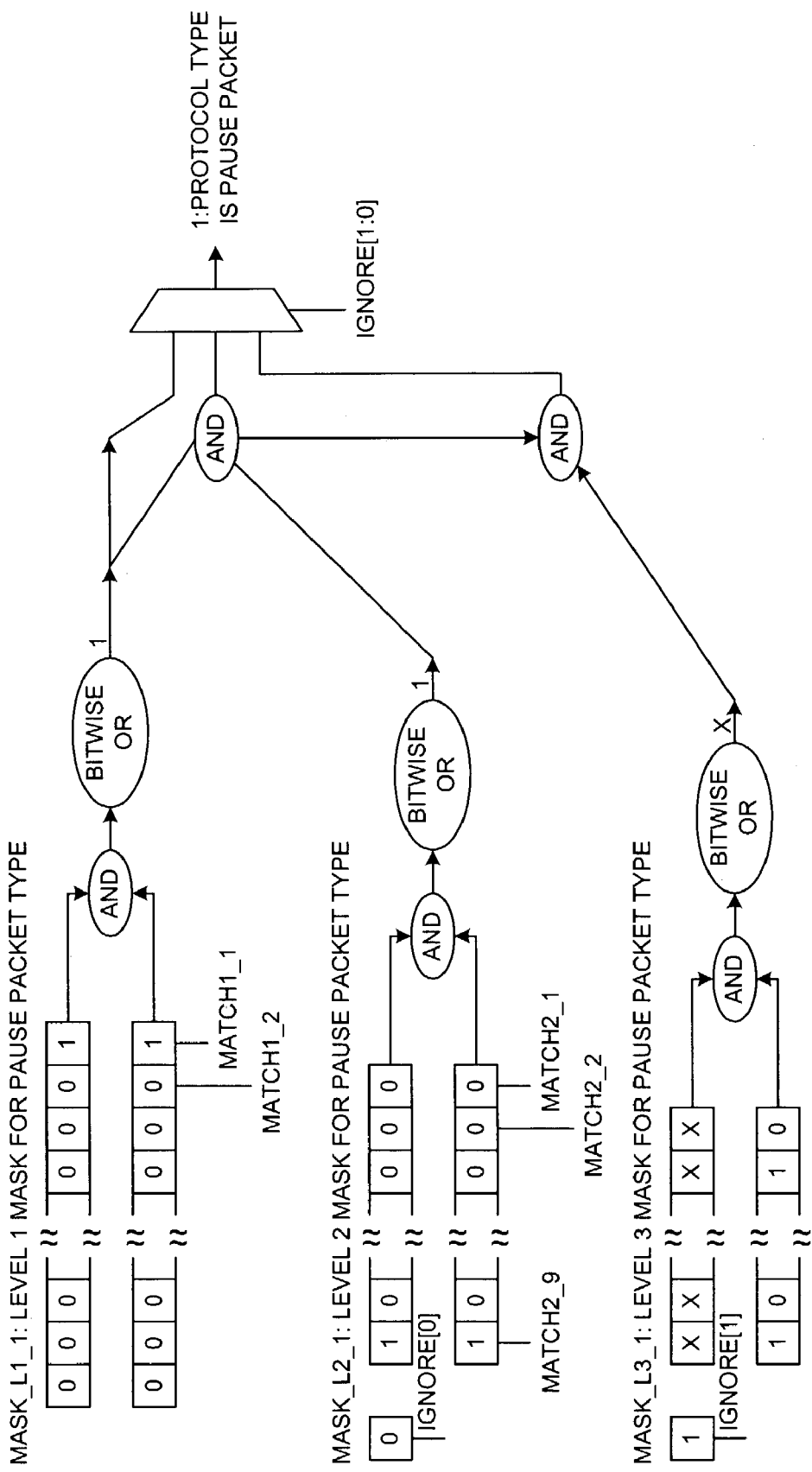
FIG. 9 is a diagram illustrating an example of a matching result aggregation for protocol type of a pause packet.

Referring to FIG. 9, a diagram is shown illustrating an example of the matching result aggregation block 504 for protocol type of pause packet. In the matching result aggregation stage 504, the matched pattern indexes obtained at levels 1, 2, and 3 may need to be aggregated and may result in a protocol type. A host CPU, which may be responsible for configuration of the key patterns for each protocol, may fulfill the task without much effort. However, this may not be feasible for timing critical cases. In such timing critical cases, hardware implementation of matching results aggregation may be more practical. Three mask registers may be defined for each protocol type. In one example, a mask register MASK_L1_j, a mask register MASK_L2_j, and a mask register MASK_L3_j may be used for a protocol type j. In the mask register MASK_L1_j, each bit may be associated with the patterns defined in the level 1 register bank. Those bits related to the patterns which protocol type j may use may be set to 1, with the other bits being set to zero. The mask registers MASK_L2_j and MASK_L3_j may be defined similarly. An extra bit may be used in the mask register MASK_L2_j and the mask register MASK_L3j to indicate whether the matching result from level 2 or level 3 should be ignored during aggregation. As shown in FIG. 9, the signal IGNORE [1:0] may be the two bits used for this purpose. FIG. 9 may also illustrate how the mask registers operate with the 3-level matching result to decode the protocol type.

The various signals of the present invention are generally "on" (e.g., a digital HIGH, or 1) or "off" (e.g., a digital LOW, or 0). However, the particular polarities of the on (e.g., asserted) and off (e.g., de-asserted) states of the signals may be adjusted (e.g., reversed) accordingly to meet the design criteria of a particular implementation. Additionally, inverters may be added to change a particular polarity of the signals. As used herein, the term "simultaneously" is meant to describe events that share some common time period but the term is not meant to be limited to events that begin at the same point in time, end at the same point in time, or have the same duration.

While the invention has been particularly shown and described with reference to the preferred embodiments thereof, it will be understood by those skilled in the art that various changes in form and details may be made without departing from the spirit and scope of the invention.

The invention claimed is:

1. An apparatus comprising:
a memory configured to store a plurality of pattern sets, each of said pattern sets respectively comprising an index value and a data value;
a first pattern matching circuit configured to (i) generate a first pointer to read a first set of said pattern sets and (ii) assert a first of a plurality of match signals in response to both a first position and a first content of a first unit of an incoming data signal matching both said index value and said data value of said first set;
a second pattern matching circuit configured to (i) generate a second pointer to read a second set of said pattern sets and (ii) assert a second of said match signals in response to both a second position and a second content of a second unit of said incoming data signal matching both said index value and said data value of said second set; and
a results circuit configured to assert a protocol indication signal in response to assertion of at least one of said match signals.

2. The apparatus according to claim 1, wherein said first pattern matching circuit is further configured to seek a protocol of said incoming data signal at first level of a multi-level pattern and said second pattern matching circuit is further configured to seek said protocol at a second level of said multi-level pattern.

3. The apparatus according to claim 2, further comprising:
a third pattern matching circuit configured to seek said protocol at a third level of said multi-level pattern.

4. The apparatus according to claim 3, wherein said first pattern matching circuit, said second pattern matching circuit and said third pattern matching circuit simultaneously search said incoming data signal.

5. The apparatus according to claim 3, wherein:
said first pattern matching circuit comprises a first state machine;
said second pattern matching circuit comprises a second state machine; and
said third pattern matching circuit comprises a third state machine.

6. The apparatus according to claim 5, wherein
said third state machine compares said incoming data signal with information stored in a third set of said pattern sets.

7. The apparatus according to claim 5, wherein said first state machine defines a plurality of states comprising a no match state, a match in progress state, a matched state and an increment said first pointer state.

8. The apparatus according to claim 1, wherein said results circuit is further configured to assert said protocol indication signal in response to assertion of all of said match signals.

9. The apparatus according to claim 1, wherein a plurality of search criteria stored in said pattern sets are configurable after fabrication of said apparatus has been completed.

10. The apparatus according to claim 9, wherein each of said search criteria are independently configurable.

11. An apparatus comprising:
means for storing a plurality of pattern sets, each of said pattern sets respectively comprising an index value and a data value;
means for (i) generating a first pointer to read a first set of said pattern sets and (ii) asserting a first of a plurality of match signals in response to both a first position and a first content of a first unit of an incoming data signal matching both said index value and said data value of said first set;
means for (i) generating a second pointer to read a second set of said pattern sets and (ii) asserting a second of said match signals in response to both a second position and a second content of a second unit of said incoming data signal matching both said index value and said data value of said second set; and
means for asserting a protocol indication signal in response to assertion of at least one of said match signals.

12. The apparatus according to claim 11, wherein said means for storing contains:
a first search criteria of a first protocol;
a second search criteria of a second protocol; and
a third search criteria of a third protocol, wherein each of said means for generating simultaneously search said incoming data signal.

13. A method for determining a protocol from an incoming data signal apparatus comprising:
(A) reading a first set of a plurality of pattern sets from a table in response to a first pointer, each of said pattern sets respectively comprising an index value and a data value;
(B) asserting a first of a plurality of match signals in response to both a first position and a first content of a first unit of said incoming data signal matching both said index value and said data value of said first set;

(C) reading a second set of said pattern sets from said table in response to a second pointer;

(D) asserting a second of said match signals in response to both a second position and a second content of a second unit of said incoming data signal matching both said index value and said data value of said second set; and (E) asserting a protocol indication signal in response to assertion of at least one of said match signals.

14. The method according to claim 13, wherein step (B) comprises searching for a first criteria in said incoming data signal and step (D) comprises searching for a second criteria in said incoming data signal.

15. The method according to claim 14, wherein each of said searching steps occur simultaneously.

16. The method according to claim 13, wherein step (B) seeks a protocol of said incoming data signal at a first level of a multi-level pattern and step (D) seeks said protocol at a second level of said multi-level pattern.

17. The method according to claim 13, wherein said pattern sets further comprise a respective pattern value indicating a start of pattern, a continuation of pattern, an end of pattern and a start-and-end of pattern.

18. The method according to claim 13, wherein said pattern sets further comprise a respective comparison value indicating one of (i) an equality operation and (ii) a less than or equal operation to be used in searching said incoming data signal.

19. The method according to claim 13, wherein said index value defines an offset of a position in a payload of said incoming data signal.

20. The method according to claim 13, further comprising the steps of:

reading a third set of said pattern sets from said table in response to a third pointer; and asserting a third of said match signals in response to both said first position and said first content of said first unit of said incoming data signal matching both said index value and said data value of said third set.

* * * * *